United States Patent Office 2,837,524
Patented June 3, 1958

2,837,524

PROCESS FOR THE MANUFACTURE OF POLYMETHYLENEIMINES

Hans Oberrauch, Burgkirchen, Oberbayern, Germany, assignor to Farbwerke Hoechst Aktiengesellschaft vormals Meister Lucius & Bruning, Frankfurt am Main, Germany, a corporation of Germany No Drawing. Application October 22, 1954
Serial No. 464,167

Claims priority, application Germany October 29, 1953

12 Claims. (Cl. 260—293.2)

This invention relates to the preparation of polymethyleneimines and particularly relatives to the preparation thereof in high yields and without the use of excessive pressures or temperatures.

It is generally well known that the hydrogenation of cyclic amides, such as lactams, require the expenditure of a high amount of energy. These reactions usually take place at excessive pressures ranging between about 200 to 300 atmospheres and in the presence of catalysts. By these methods hexamethyleneimine is produced by means of a catalytic hydrogenation of ε-caprolactam in the presence of ammonia at 335° C. and 210 atmospheres (French patent 860,398). According to this French patent, furthermore, the reduction would also be possible at atmospheric pressure when the temperature is maintained at 275° C. if the reaction is carried out in the presence of ammonia together with an extremely active catalyst such as nickel or diatomaceous earth. It is also generally believed that lactams such as α-piperidone or α-pyrrolidone can be catalytically reduced only to a very small extent.

In contrast to the above, it has been discovered that lactams such as α-piperidone or α-pyrrolidone can be catalytically hydrogenated without any great increase of pressure and without the necessity of using ammonia. It has been found that a good yield can be obtained by means of passing the lactam, corresponding to its vapor pressure, and with an excess of hydrogen at atmospheric pressure, over certain hydrogenation catalysts at temperatures just slightly higher than the condensation point of the lactam. The resulting polymethyleneimine-lactam-water-mixture is then processed in the known way. A good yield of polymethyleneimine results.

Catalysts which are especially suited for the above hydrogenation process comprise metals of the first and second group of the periodic system such as copper or cadmium, or a combination of the two. Salts containing the hydrogenation metal such as nitrates or carbonates are provided on carriers made of porous materials such as active alumina or silica gel and are reduced in the ordinary way at elevated temperatures before they are used in the hydrogen stream.

The temperature at which the hydrogenation is carried out should be betweeen about 200° and 350° C.; however, the most advantageous results are achieved when the temperature range is kept between about 230° to 290° C.; care being taken in every case to keep above the condensation point of the lactam at hand.

One of the primary advantages of the above-described process consists of the fact that it can be carried out without the necessity of providing excessive pressure and without the presence of ammonia. Furthermore, in contrast to the heretofore-used processes, there is a very high yield of the polymethyleneimines.

Following are certain specific examples of the present invention, these examples being for the purpose of illustration only and not being intended to limit the invention in any manner:

Example 1

75.15 parts by weight of α-piperidone are vaporized in a jacketed vaporizing container which is provided with a gas inlet and outlet and a thermometer. Vaporization is brought about by heating the material to 185° C.; then hydrogen was passed through the vaporizing container to the reaction chamber filled with 180 cc. of a catalyst containing cadmium on active alumina, hydrogenation taking place at 265° C. The hydrogen is permitted to flow through at a speed of 11 liters/hour for a period of 49½ hours and in this time carries all α-piperidone vaporizing in the vaporizing container from the latter into the reaction chamber. The resulting α-piperidone-piperidine-water-mixture leaving the outlet of the reaction chamber is condensed and collected in three intercommunicating separate containers, of which the first is cooled with an ice-sodium chloride mixture, the second is cooled with an alcohol-carbonic acid mixture and the third contains 50 cc. of 1-N-hydrochloric acid. The contents of the first two containers are then combined and distilled over into a further vessel containing 1-N-hydrochloric acid. There remain, as a distillation residue, 3.5 parts by weight of α-piperidone. Thus 95.3% of α-piperidone participated in the reaction. The contents of the third container are then combined with the hydrochloric acid solution of the distilled-over piperidine and the water was distilled off in hydrogen chloride stream. The remainder of the water then mixed with benzene for azeotropic removal. As a residue there remains piperidine-hydrochloride, from which, after addition of 2.5 times the theoretical quantity of potassium hydroxide, the piperidine was distilled off. After being dried twice over caustic potassium 57.85 parts by weight of piperidine having a boiling point of 98°–107° C. are obtained. The yield of piperidine amounted to 94% of the converted α-piperidone.

Example 2

16.2 parts by weight of α-piperidone are vaporized in a similar manner to Example 1, the vaporizing container, being heated to 180° C. Hydrogen is then passed at a speed of 12 liters/hour for 10 hours, through the vaporization container and the reaction chamber which contains 175 cc. of a catalyst comprising copper on silica gel, the reaction taking place at 265° C. When the resulting α-piperidone-piperidine-water-mixture is processed, 3.4 parts by weight of unconverted α-piperidone are regained. The conversion of the α-piperidone is, therefore, 79%. The yield of piperidine is 8.4 parts by weight and had a boiling point of 100 to 103° C. The yield of the piperidine was, therefore, 76.3% of the converted α-piperidone.

Example 3

29.4 parts by weight of α-pyrrolidone are vaporized in a manner similar to that set forth in Example 1, the vaporization container being heated to 180° C. Hydrogen is then passed, at a speed of 6½ liters/hour for 18 hours, through the vaporization container and the reaction chamber containing a catalyst comprised cadmium on activated alumina, the reaction taking place at 275° C. After the reaction mixture had been processed, as described in Example 1, 8.2 parts by weight of the α-pyrrolidone were regained. The conversion of pyrrolidone amounted, therefore, to 72%. The yield of pyrrolidine amounted to 12.1 parts by weight with a boiling point of 83.5°–88° C. The yield was 68.5% of the converted α-pyrrolidone.

Example 4

50.2 parts by weight of α-piperidone are vaporized in a manner similar to that of Example 1, the vaporizing container being heated to 188° C. Hydrogen was then passed, at a speed of 11 liters/hour for 35 hours, through the catalyst vaporizing container and the reaction chamber containing as a mixture of the reduced oxides of copper and cadmium in a ratio of 1:2. The reaction products were then processed in a similar manner to Example 1 and, besides 2.5 parts by weight of unconverted α-piperidone, there resulted 36 parts by weight of piperidine having a boiling point of 99°–104° C. The yield, therefore, was 88% of the α-piperidone.

Obviously many modifications and variations of the present invention are possible in the light of the above teachings. It is, therefore, to be understood that within the scope of the appended claims the invention may be practiced otherwise than as specifically described.

What is claimed in this invention is:

1. A process for the manufacture of polymethyleneimines which comprises vaporizing a lactam selected from the group consisting of α-piperidone and α-pyrrolidone at elevated temperature and atmospheric pressure while introducing an excess of hydrogen, jointly passing the mixture of lactam vapor and hydrogen through a hydrogenation catalyst containing at least one member selected from the group consisting of copper and cadmium at atmospheric pressure and at a temperature within the range 200°–350° C., collecting and separating the reaction mixture.

2. The process of claim 1 wherein the hydrogenation is carried out within the range 230°–290° C.

3. The process of claim 1 wherein the catalyst is supported on a porous carrier.

4. A process for the manufacture of polymethyleneimines which comprises vaporizing a lactam selected from the group consisting of α-piperidone and α-pyrrolidone at elevated temperature and atmospheric pressure while introducing an excess of hydrogen, jointly passing the mixture of lactam vapor and hydrogen through a copper containing hydrogenation catalyst at atmospheric pressure and at a temperature within the range 200°–350° C., collecting and separating the reaction mixture.

5. The process of claim 4 wherein the hydrogenation is carried out within the range 230°–290° C.

6. The process of claim 4 wherein the copper containing catalyst is supported on a porous carrier.

7. A process for the manufacture of polymethyleneimines which comprises vaporizing a lactam selected from the group consisting of α-piperidone and α-pyrrolidone at elevated temperature and atmospheric pressure while introducing an excess of hydrogen, jointly passing the mixture of lactam vapor and hydrogen through a cadmium containing hydrogenation catalyst at atmospheric pressure and at a temperature within the range 200°–350° C., collecting and separating the reaction mixture.

8. The process of claim 7 wherein the hydrogenation is carried out within the range 230°–290° C.

9. The process of claim 7 wherein the cadmium containing catalyst is supported on a porous carrier.

10. A process for the manufacture of polymethyleneimines which comprises vaporizing a lactam selected from the group consisting of α-piperidone and α-pyrrolidone at elevated temperature and atmospheric pressure while introducing an excess of hydrogen, jointly passing the mixture of lactam vapor and hydrogen through a copper and cadmium containing hydrogenation catalyst at atmospheric pressure and at a temperature within the range 200°–350° C., collecting and separating the reaction mixture.

11. The process of claim 10 wherein the hydrogenation is carried out within the range 230°–290° C.

12. The process of claim 10 wherein the copper and cadmium containing catalyst is supported on a porous carrier.

References Cited in the file of this patent

FOREIGN PATENTS 860,398   France   Jan. 13, 1941